UNITED STATES PATENT OFFICE.

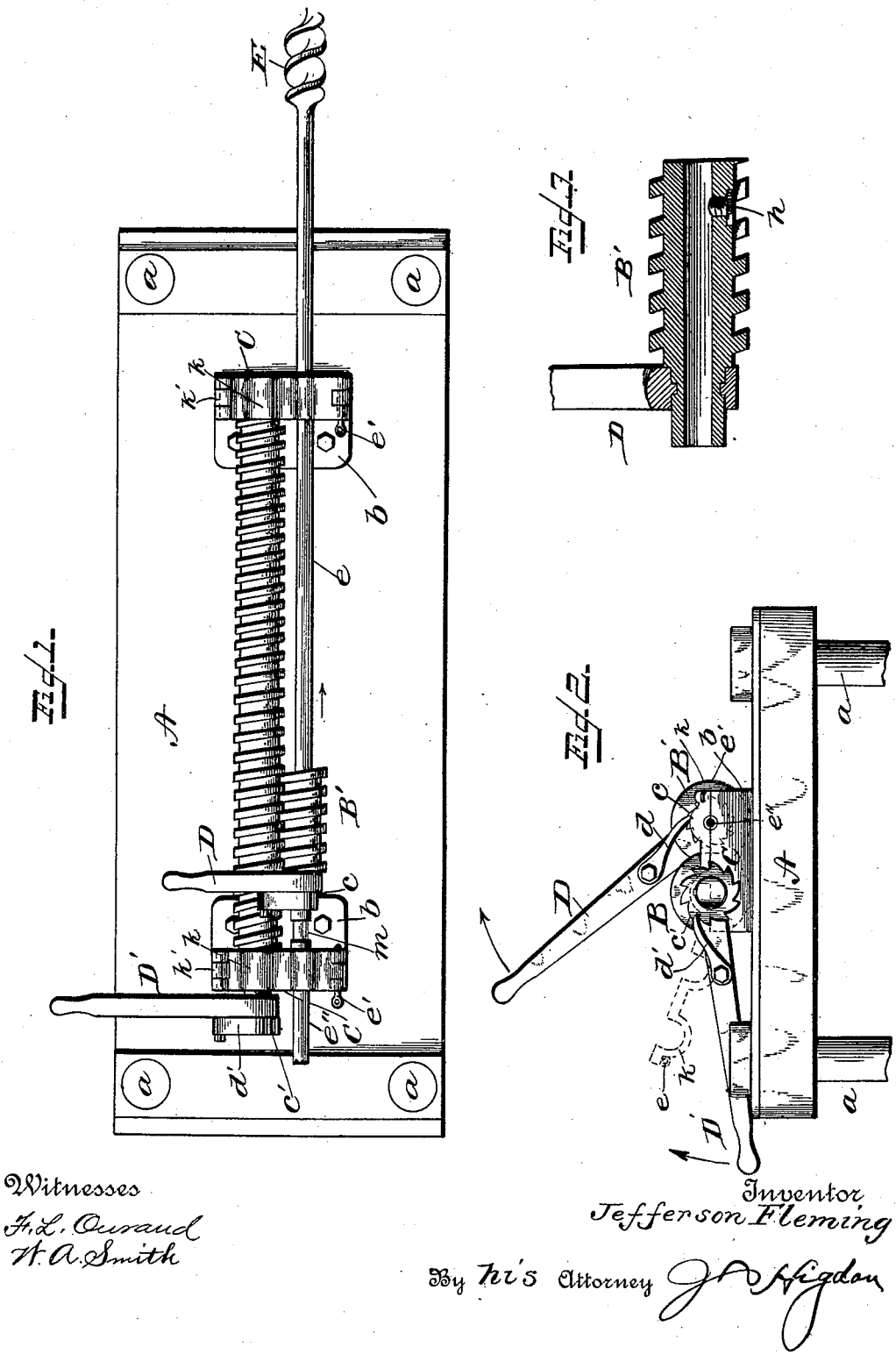

JEFFERSON FLEMING, OF KANSAS CITY, MISSOURI.

GROUND-AUGER.

SPECIFICATION forming part of Letters Patent No. 404,188, dated May 28, 1889.

Application filed January 23, 1889. Serial No. 297,303. (No model.)

*To all whom it may concern:*

Be it known that I, JEFFERSON FLEMING, of Kansas City, Jackson county, Missouri, have invented certain new and useful Improvements in Ground-Augers, of which the following is a full, clear, and exact description, reference being had to the accompanying drawings, forming a part hereof.

My invention relates particularly to earth drilling and boring machines; and it consists in the novel combination and arrangement of the various parts, as will be more fully hereinafter set forth, and pointed out in the claims.

In the drawings, Figure 1 is a plan view of my improved machine. Fig. 2 is a side view of the same, and Fig. 3 is a detail view.

Referring to the drawings, in which similar letters of reference indicate corresponding parts in all the views, A indicates the bed-plate, upon which my improved machine is secured. This bed-plate may be supported in any suitable maner, but in the drawings is shown supported by the uprights $a$ $a$, driven in the ground and passing through the apertures in the corners of the bed-plate. Near each end of the bed-plate A are secured the plates $b$, carrying the bearings C C, provided with the hinged cap-plates $k$ $k$, and in these bearings are journaled the main screw or worm B and the auger or drill shaft $e$, which passes through the smaller screw, B', and is secured therein. The screws or worms B B' are cut with the same threads, and are so arranged that they mesh with each other, and upon their rear ends are keyed the ratchet-wheels $c$ $c'$, and loosely mounted on said ends are the levers D D', carrying the pawls $d$ $d'$, adapted to engage with the ratchets $c$ $c'$, respectively. The small screw or worm B' is hollow, as shown, through which is passed the auger or drill shaft $e$, by which it is supported in the bearings C C, said shaft being held in the screw or worm by a set-screw, $h$, which rests in a countersink, so as to leave a smooth surface for the meshing worms or screws. The cap-plates $k$ $k$ are usually curved or cut out to conform to the size and shape of the journals of the screw B and the drill-shaft $e$, and to prevent said caps from flying up or becoming loose I secure them by means of hinge $k'$ and a catch, $e'$, as shown.

The auger or drill E may be of any desired construction, according to the nature of the substance to be drilled, and in the present instance the machine is shown provided with a form of auger usually employed in boring soft earth.

The operation of my device is as follows: The bed-plate having been set in the desired position, the worm or screw B placed in its bearings C C, the shaft $e$ is then placed in the worm or screw B' and secured by the set-screw $h$. The shaft is then also placed in its proper place in the bearings C C, and the worms B B' are then in such a position that they will mesh with each other. The cap-plates $k$ $k$ are then turned down and locked, and the machine is then ready for boring. To accomplish the boring, the hand-lever D is operated as indicated by the arrow, whereby the pawl $d$ engages with the ratchet-wheel $c$ and causes the worm B' and drill to revolve. As the worm B' revolves it meshes with the threads of the screw or worm B, and is therefore fed along the worm B so long as the hand-lever D is caused to operate. The auger by this arrangement will have a forward movement equal to the length of the worm B, and in case the shaft $e$ is not long enough I remedy the defect by joining to it a pipe or rod, $e''$, as at $m$, Fig. 1, and it will be seen from this that I can force the auger into any desired extent. When the screw or worm B' has reached the bearing C at the forward end of the screw or worm B, the set-screw $h$ is released, and the lever D' is then put in operation, as indicated by the arrow, which causes the worm or screw B to revolve, and, being stationary and meshing with the worm or screw B', brings said screw B' back to the rear bearing C. Here the set-screw is again turned to its place and the first step of the operation is repeated.

It is obvious that this device can be used for boring vertical as well as horizontal holes, and when so used the bed-plate A is secured in a vertical position somewhat similar to the manner herein described.

Having thus described my invention, what I claim as new, and desire to secure by Letters Patent, is—

1. In a drilling and boring machine, the combination, with a longitudinally stationary but revoluble worm or screw, of a movable screw meshing with the stationary screw and carrying the drill-shaft, substantially as shown and described.

2. In a drilling and boring machine, the combination, with a stationary worm or screw supported in suitable bearings, of a movable worm or screw meshing with and fed along the stationary worm, said movable worm being hollow and adapted to receive the drill-shaft, substantially as shown and described.

3. In a drilling-machine, the combination, with a stationary worm, of a movable worm meshing with and fed along the stationary worm, said movable worm being hollow and adapted to receive the drill-shaft, and the levers attached to the worms for operating the same, substantially as shown and described.

4. The combination, with a fixed worm, of a movable worm carrying the drill-shaft and meshing with the fixed worm, the ratchet-wheels keyed on the ends of the worms, and the levers loosely mounted on the said ends and carrying pawls adapted to engage with the ratchets, substantially as and for the purpose described.

5. The combination, with a bed-plate carrying the bearings C C, of the fixed worm journaled in said bearings, the hollow movable worm meshing with the fixed worm and carrying the drill-shaft, which is also mounted in the bearings C C, the levers D D', carrying pawls $d$ $d'$, adapted to engage, respectively, with the ratchet-wheels $c$ $c'$, and the hinged cap-plates $k$ $k$, for holding the fixed worm and drill-shaft in position, substantially as shown and described.

In testimony whereof I affix my signature in presence of two witnesses.

JEFFERSON FLEMING.

Witnesses:
F. G. FISCHER,
A. A. HIGDON.